United States Patent
Nakagata et al.

(10) Patent No.: US 8,818,015 B2
(45) Date of Patent: Aug. 26, 2014

(54) MARKER PLACEMENT DEVICE, MARKER PLACEMENT DETECTING DEVICE, AND COMPUTER READABLE STORAGE MEDIUM FOR STORING MARKER PLACEMENT PROGRAM

(75) Inventors: Shohei Nakagata, Kawasaki (JP); Kensuke Kuraki, Kawasaki (JP); Jun Takahashi, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 710 days.

(21) Appl. No.: 13/010,342

(22) Filed: Jan. 20, 2011

(65) Prior Publication Data

US 2011/0228969 A1 Sep. 22, 2011

(30) Foreign Application Priority Data

Mar. 16, 2010 (JP) .................................. 2010-58579

(51) Int. Cl.
*G06K 9/00* (2006.01)
*G09C 5/00* (2006.01)
(52) U.S. Cl.
CPC ....................................... *G09C 5/00* (2013.01)
USPC ......................................... 382/100; 382/103
(58) Field of Classification Search
CPC .............. G09C 5/00; G09C 1/00; G09C 2/00; H04L 9/28; H04L 2209/80; H04L 2209/12
USPC ......... 382/100, 113, 135, 155, 162, 173, 181, 382/199, 219, 224, 232, 240, 254, 274, 276, 382/291, 305, 312; 713/168, 173, 176, 28, 713/54, 55, 46, 201, 243; 726/26; 341/50–51, 65, 67, 106–107; 375/240, 375/240.19, 240.2, 240.26; 358/3.28; 348/143, 150, 231.99, 509, 589; 709/231; 725/136
See application file for complete search history.

(56) References Cited

U.S. PATENT DOCUMENTS

| 5,111,514 A * | 5/1992 | Ohta ............................. 382/177 |
| 7,860,270 B2 * | 12/2010 | Nakamura et al. ............ 382/100 |
| 2006/0289625 A1* | 12/2006 | Tamune ......................... 235/375 |
| 2009/0214033 A1* | 8/2009 | Nakagata et al. ............. 380/243 |
| 2009/0238361 A1 | 9/2009 | Anan et al. |
| 2009/0323950 A1 | 12/2009 | Nakagata et al. |
| 2011/0211065 A1* | 9/2011 | Furui ............................ 348/135 |

FOREIGN PATENT DOCUMENTS

| JP | 2008-301044 | 12/2008 |
| JP | 2009-232233 | 10/2009 |

* cited by examiner

*Primary Examiner* — Hadi Akhavannik
*Assistant Examiner* — Mehdi Rashidian
(74) *Attorney, Agent, or Firm* — Staas & Halsey LLP

(57) ABSTRACT

A marker placement device includes, a marker placement method decision section that decides, for every predetermined pitch from a starting edge of a side to an end edge of the side, a placement position of a marker for detecting a position within a rectangular image region, the placement position being along the side of the image region within an image. A marker adding section that adds the marker to the image according to the placement position decided is provided, where, when a gap shorter than the pitch remains between the end edge and the decided placement position closest to the end edge of the side, the marker placement method decision section decides a first marker placement position closest to the starting edge, and decides a subsequent marker placement position.

20 Claims, 24 Drawing Sheets

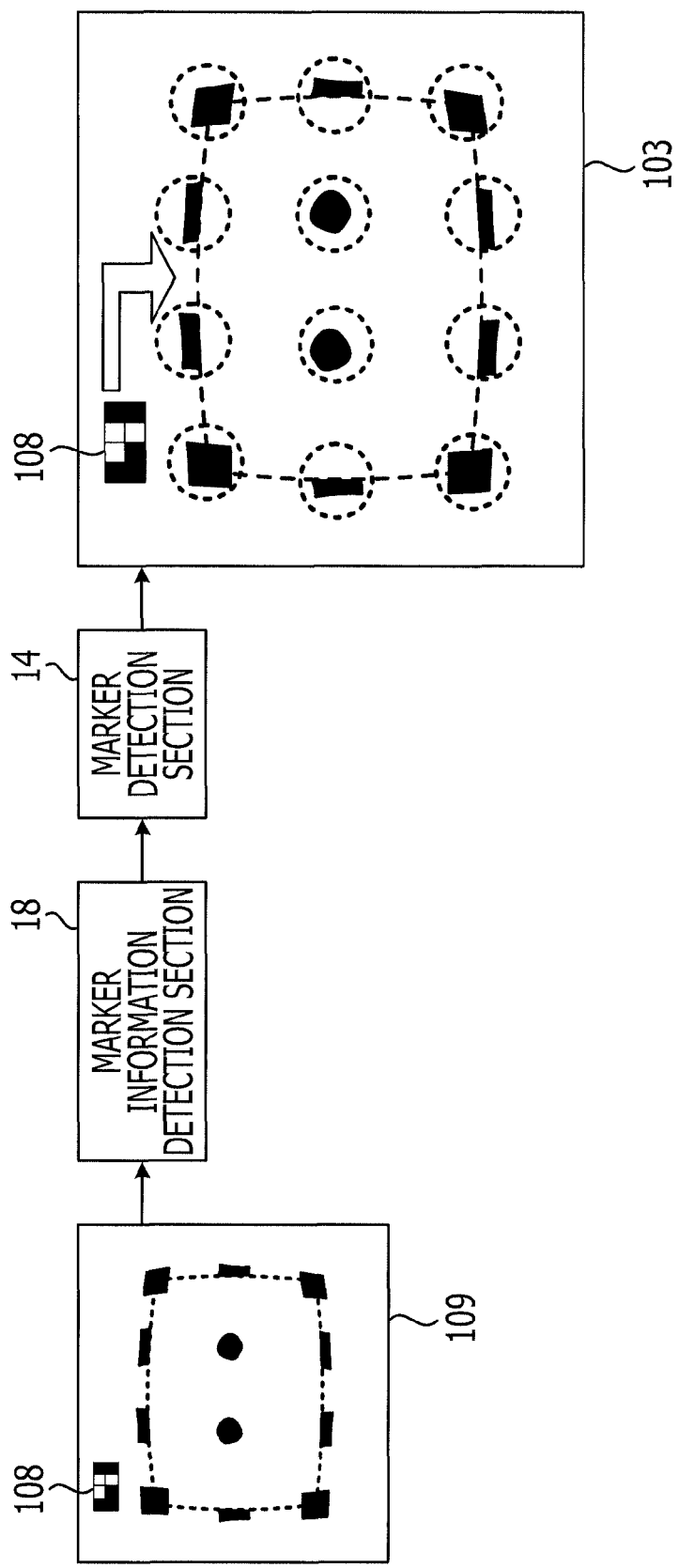

MARKER PLACEMENT DEVICE, MARKER PLACEMENT DETECTING DEVICE, AND COMPUTER READABLE STORAGE MEDIUM FOR STORING MARKER PLACEMENT PROGRAM

CROSS-REFERENCE TO RELATED APPLICATIONS

This application is based upon and claims the benefit of priority of the prior Japanese Patent Application No. 2010-58579, filed on Mar. 16, 2010, the entire contents of which are incorporated herein by reference.

BACKGROUND

1. Field

Various embodiments presented and described herein relate to a technique and device of appropriately detecting a specific position of an acquired image.

2. Description of the Related Art

As society becomes more information-oriented, the leakage of confidential information is becoming a serious problem. As a result, technologies are being developed to prevent the leakage of information of not only digital data but also printed materials. For example, there is a typical technique for preventing the leakage of information from printed materials by visually encrypting information so as to hide the information from third parties before printing. With this technique, an encrypted image in the printed material is read by a scanner or camera and the original information can be seen by implementing a recovery process that uses a decryption key (for example, a password) for the image.

Japanese Laid-open Patent Publication No. 2008-301044 describes a technique of placing markers used for detecting a position of an encrypted image region at the four corners of a rectangular encrypted image region on printed material to make identification of an encrypted image region easier. Japanese Laid-open Patent Publication No. 2009-232233 describes a technique that allows restoring a partial image of an encrypted image region by saving a region of the partial image located by the markers ahead of time and then, when decrypting the encrypted image region, combining the saved partial image with the decrypted image region based on the marker placement.

For example, a more precise encrypting pattern placed inside the image region may be used to increase secure use of the encrypted information stored into an image region. However, very accurate position detecting of the placement position of the encrypted pattern inside the encrypted image region is required to read this type of pattern and decrypt the original information. However, using the markers placed at the four corners of an encrypted image region for detecting the position of the encrypted image region as in the previously described technique does not provide enough accuracy to detect the placement position of an encrypted pattern.

SUMMARY

In accordance with an aspect of an embodiment, a marker placement device includes, a marker placement method decision section that decides, for every predetermined pitch from a starting edge of a side to an end edge of the side, a placement position of a marker for detecting a position within a rectangular image region, where the placement position is along the side of the image region within an image. The maker placement device includes a marker adding section that adds the marker to the image according to the placement position decided, wherein, when a gap shorter than the pitch remains between the end edge and the decided placement position closest to the end edge of the side, a first marker placement position closest to the starting edge is decided, and a subsequent marker placement position at the predetermined pitch after providing, on a starting edge side of the side, an offset shorter than the gap is decided.

The objects and advantages of the invention will be realized and attained by means of the elements and combinations particularly pointed out in the claims. It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawing of which:

FIG. 20 is a diagram describing an operation of a marker placement information detection section.

DETAILED DESCRIPTION

Figure 1:
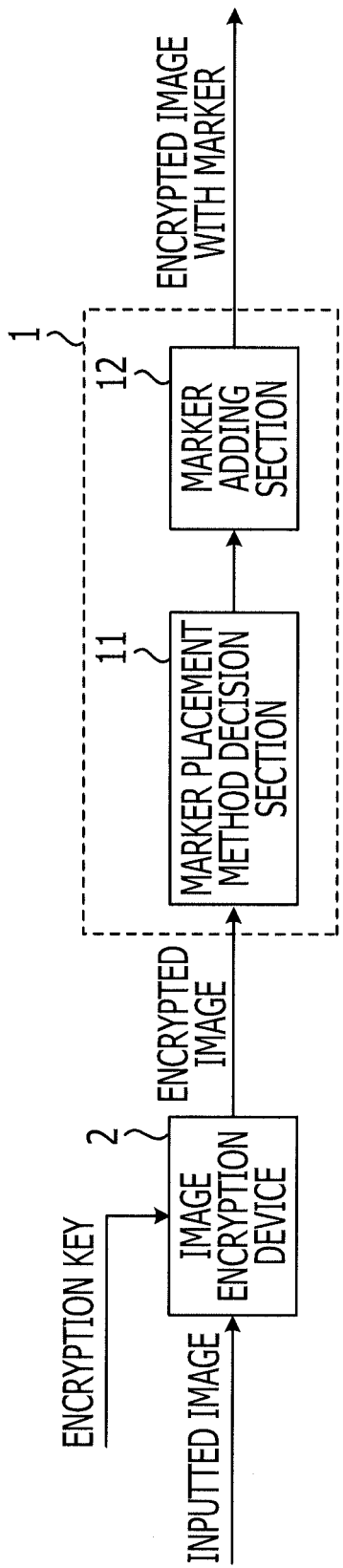
FIG. 1 is a block diagram of a first example of an image encryption system.

Reference will now be made in detail to the embodiments, examples of which are illustrated in the accompanying drawings, wherein like reference numerals refer to the like elements throughout. The embodiments are described below to explain the present invention by referring to the figures.

Herein FIG. 1 will be described. FIG. 1 is a block diagram of a first example of an image encryption system. This image encryption system includes a marker placement device 1 and an image encryption device 2. The marker placement device 1 includes a marker placement method decision section 11 and a marker adding section 12 as functional blocks.

In an embodiment, the marker placement device 1 conducts an operation to place marker(s) for detecting positions of an encrypted image outputted from the image encryption device 2. First, a brief explanation of the image encryption by the image encryption device 2 will be described using FIG. 2. While sequentially numbered exemplary devices and operations (methods) are described herein in detail, the present invention is not limited to the particular examples and elements of the particular examples. For example, an element of one example may be implemented with another exemplary operation and/or device.

First, in operation [1], the image encryption device 2, for example, selects a rectangular encryption target region 102 from an inputted image 101 in response to a selection command input and the like, or other trigger causing the encryption. Next, in operation [2], the selected encryption target region 102 is divided into small blocks of a specific size. Then in operation [3], using a provided encryption key 110, for example, the encryption target region 102 is encrypted in block units. The encryption of the target region 102 may be implemented using various techniques or method including for example, the method described above in relation to Japanese Laid-open Patent Publication No. 2008-301044. However, the present invention is not limited to any particular encryption technique. Subsequent to the encryption of the target region 102, a regionally encrypted image 103 is obtained. Finally in operation [4], regional position detection markers 104 for detecting positions of regions of the regionally encrypted image 103 are placed abutting the four corners of the regional encrypted image 103 on the outside to obtain an encrypted image 105 which is outputted to the marker placement device 1.

Next, placement position decision by a marker placement method decision section 11 in FIG. 1, and marker placement by a marker adding section 12 are described. The marker placement method decision section 11 decides a placement position of marker(s) for detecting a position inside the image region along a side of a rectangular image region in the image that is the target for the marker placement. The marker adding section 12 adds markers to the image according to the placement position decision. The image encryption system of FIG. 1 outputs the encrypted image 105 with the markers added by the marker adding section 12 of the marker placement device 1.

The method for deciding the marker placement position by the marker placement method decision section 11 may be the same in each direction of two adjoining sides of the image region rectangle, that is in the lateral and vertical directions of the image region. Here, the method for deciding the placement positions in the lateral direction will be described using FIGS. 3A and 3B.

Figure 3A:
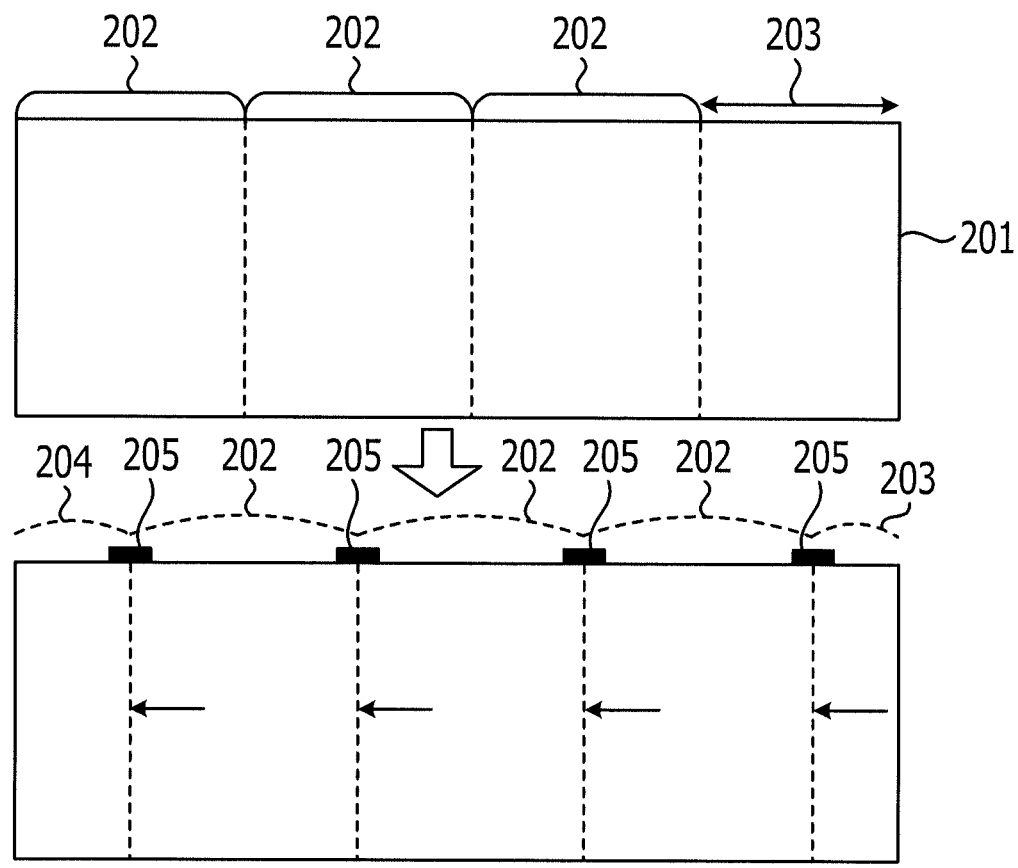
FIG. 3A is a first diagram describing a method for deciding a marker placement position.
Figure 3B:
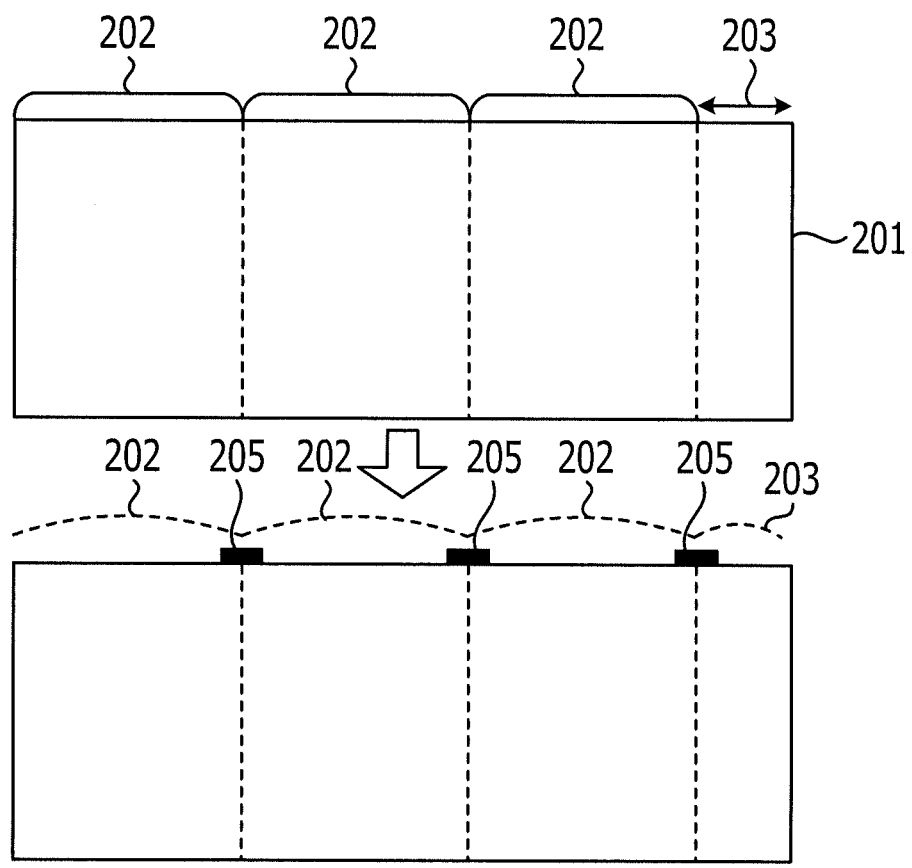
FIG. 3B is a second diagram describing a method for deciding a marker placement position.

In FIGS. 3A and 3B, an image region 201 is a region of the regionally encrypted image 103 included in the encryption image 105 sent by the image encryption device 2. The marker placement method decision section 11 decides placement positions of markers in a direction (for example, from the left side to the right side in FIGS. 3A and 3B) from one edge (a starting edge) to another edge (an end edge) at a specific pitch 202 that is predetermined. A specific (predetermined) pitch, according to an embodiment, may be variable based on various criteria including spacing of content (characters).

However, due to the relationship between the width of the image region 201 and the pitch 202, a gap 203 that is narrower than the pitch 202 may be left between the decided marker placement position closest to the end edge and the end edge as illustrated in FIG. 3A. In this case, the marker placement method decision section 11 decides a first marker placement position closest to the starting edge after providing an offset 204 that is shorter than the gap 203, and then decides subsequent marker placement positions in the predetermined (certain) pitch 202 from the first marker placement position. Then, the marker adding section 12 places sub-regional position detection markers 205 next to the outside of the lateral side according to the decision. By making the gap 203 narrower in this way, the detection accuracy of the position in the gap 203 of the image region 201 is improved since the lateral distance between the sub-regional position detection marker 205 closest to the end edge and the end edge of the image region 201 is reduced. Also, the lateral distance between the sub-regional position detection marker 205 closest to the starting edge and the starting edge of the image region 201 becomes the same distance as the length of the offset 204 and thus shorter than the distance of the gap 202. Therefore, the accuracy for detecting positions inside the offset 204 of the image region 201 is improved.

In an embodiment, when the gap 203 is narrow as illustrated in FIG. 3B, specifically when the gap 203 is ½ or less than the pitch 202, the marker placement method decision section 11 upholds the use of the aforementioned marker placement position decision. In other words, in this case, the marker placement method decision section 11 does not provide the offset 204 and the marker adding section 12 adds the sub-regional position detection markers 205 next to the outside of the lateral side according to the upheld decision. In this case, the length of the gap 203 is shorter than the lateral distance from the midpoint of the adjacent sub-regional position detection marker 205 to the closest sub-regional position detection marker 205 separated by the pitch 202. As a result, the marker placement method decision section 11 upholds the marker placement position decision as described previously since an appropriate level of accuracy of position detection can be obtained within the gap 203 of the image region 201.

Further, according to an embodiment, when the gap 203 is wider as illustrated in FIG. 3A than the gap 203 in FIG. 3B, specifically when the gap 203 is greater than ½ of the pitch 202, the marker placement method decision section 11 makes the offset 204 one half of the length of the pitch 202. As a result, in this case, the marker placement method decision section 11 decides the placement position of the marker closest to the starting edge after providing the offset 204 of the aforementioned length on the starting edge side of the lateral side, and then decides the subsequent marker placement positions at each specific pitch 202. Then, the marker adding section 12 adds sub-regional placement detection markers 205 next to the outside of the lateral side according to the decision. As will be explained in detail below, by doing so, the accuracy of a searching process from the starting edge side of the image region after the sub-region position detection marker 205 improves since the offset 204 value becomes a known and invariable value. Also the load of the process is reduced.

Figure 4:
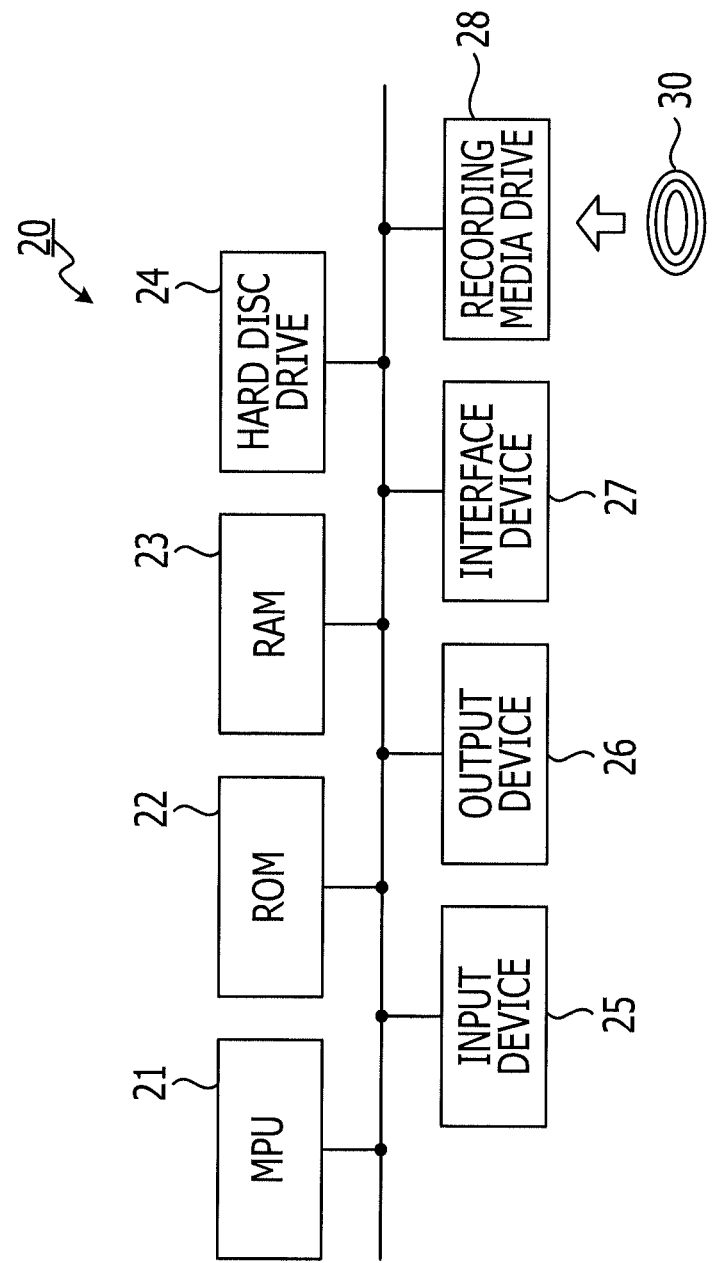
FIG. 4 is an example of a typical computer hardware configuration.

As illustrated in the example in FIG. 4, it is possible to have a computer with a typical hardware configuration implement a function of the marker placement device illustrated in FIG. 1. Next, FIG. 4 will be described.

A computer 20 includes a micro processing unit (MPU) 21, a read only memory (ROM) 22, a random access memory (RAM) 23, a hard disc device 24, an input device 25, an output device 26, an interface device 27, and a recording media drive 28. The configuration elements are connected via a bus 29 and transfer various types of data with each other under the control of the MPU 21.

The MPU 21 is an arithmetic processing unit that controls operations of the entire computer 20. The ROM 22 is a read-only semiconductor memory storing a specific pre-recorded basic control program. The MPU 21 is able to control operations of each configuration element of the computer 20 by reading and executing the basic control program when the computer 20 is activated.

The RAM 23 is a random write and read semiconductor memory that uses a working storage region as necessary when the MPU 21 executes various types of control programs.

The hard disc device 24 is a storage device that stores various types of data and control programs to be executed by the MPU 21. Various types of control processes to be explained below can be conducted by reading and executing specific control programs stored in the hard disc device 24.

The input device 25 is a keyboard and/or mouse. When a user of the computer 20 operates the input device 25, the input device 25 obtains information from the user associated with the operation and sends the inputted information to the MPU 21.

The output device 26 is for example a liquid crystal display and displays various types of text and images according to display data sent from the MPU 21. Also, the output device 26 includes a printer and prints objects placed by the sub-regional position detection marker 205 in the encrypted image 105 on paper.

The interface device 27 transfers of various types of data between each of various devices connected in the computer 20. Therefore, when the computer 20 functions as the marker placement device 1, the interface device 27 receives the encrypted image 105 outputted from the image encryption device 2.

The recording media drive 28 is a device that reads various types of control programs and data recorded in a portable recording medium 30. The MPU 21 can read and execute a specific control program recorded on the portable recording medium 30 via the recording media drive 28, and can conduct various control processing to be explained below. The portable recording medium 30 may be, for example, a Compact Disc Read Only Memory (CD-ROM) or a Digital Versatile Disc Read Only Memory (DVD-ROM).

To cause the computer 20 to operate as the marker placement device 1, first a control program to cause the MPU 21 to conduct content of the marker placement processing to be explained below is created. The created control program is saved in advance on the hard disc device 24 or the portable recording medium 30. Then, the control program is read and executed according to a specific instruction to the MPU 21. By doing so, the MPU 21 operates the marker placement method decision section 11 and the marker adding section 12.

In the same way, it is possible to cause the computer 20 to function as the image encryption device 2.

Figure 5:
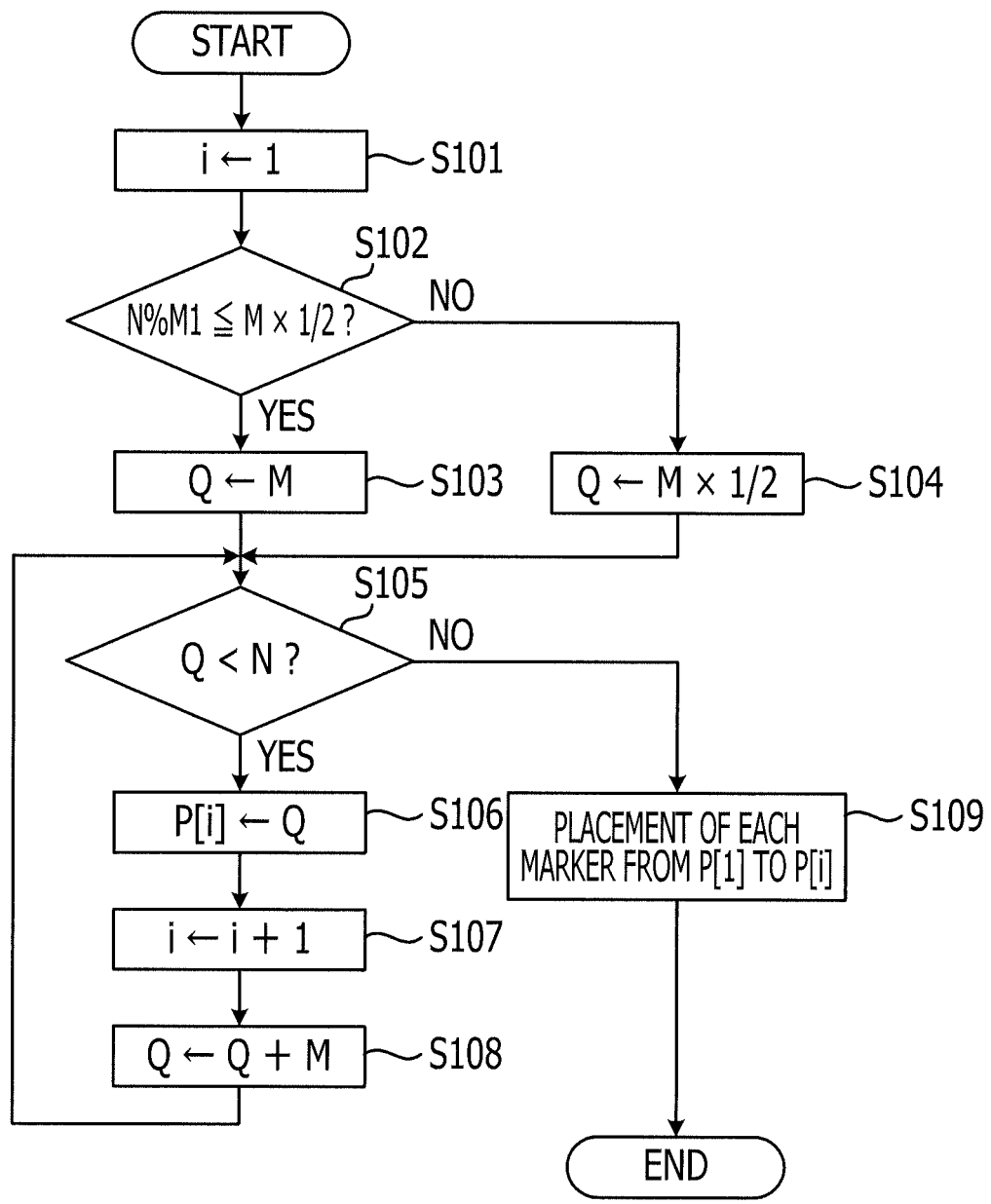
FIG. 5 is a flowchart describing content of a marker placement process.

Next, FIG. 5 will be described. FIG. 5 is a flowchart describing content of a marker placement process. The process begins when the encrypted image 105, for example, is received from the image encryption device 2.

In the following process, "N" represents a length of the side in a lateral direction of the region (in other words, image region 201) of the regionally encrypted image 103 of the encrypted image 105, and "M" represents the pitch 202 for placing the sub-regional placement detection markers 205.

In FIG. 5, first the value "1" is assigned to the variable "i" in S101.

Next, in S102, the remainder of N divided by M, "N%M," is calculated and the resulting value is compared to the result of M multiplied by ½ to determine which value is larger. As a result of the comparison, the process advances to S103 if a remainder value is determined to be equal to or less than the value resulting from the multiplication (S102 YES). On the other hand, the process advances to S104 if the remainder result is determined to be larger than the value resulting from the multiplication (S102 NO).

Next, in S103, M is assigned to the variable Q before advancing to S105. In S104, the value resulting from multiplying M by ½ is assigned to the variable Q before advancing to S105.

In S105, a process is conducted to determine whether or not the current variable Q is smaller than N. If the value of the variable Q is determined to be smaller than N (S105 YES), the process advances to S106. If the value of the variable Q is determined to be equal to or larger than N (S105 NO), the process advances to S109.

In S106, the current value of the variable Q is assigned to an element P[i] in an array P. The array P is the result of the placement position decision for the sub-regional position detection marker 205, and each element of the array P represents a distance from the starting edge of the lateral side of the image region 201.

Next, "1" is added to the current value of the variable "i" and the variable "i" is updated in S107. Next, in S108, the value resulting from adding the current value of the variable Q to M is re-assigned to the variable Q, and then the process returns to S105 and the above processes are repeated. The function of the marker placement method decision section 11 is provided by the computer 20 by executing the above processes from S101 to S108.

Next, in S109, the adding process of the total "i" amount of the sub-regional position detection markers 205 abutting the outside of the lateral side of the image region 201 and represented by each of the elements from P[1] to P[i] in the array P is conducted, and then the process illustrated in FIG. 5 is completed. By conducting the process of S109, a function as the marker adding section 12 is provided by the computer 20. The above processes describe the marker placement process.

Figure 6A:
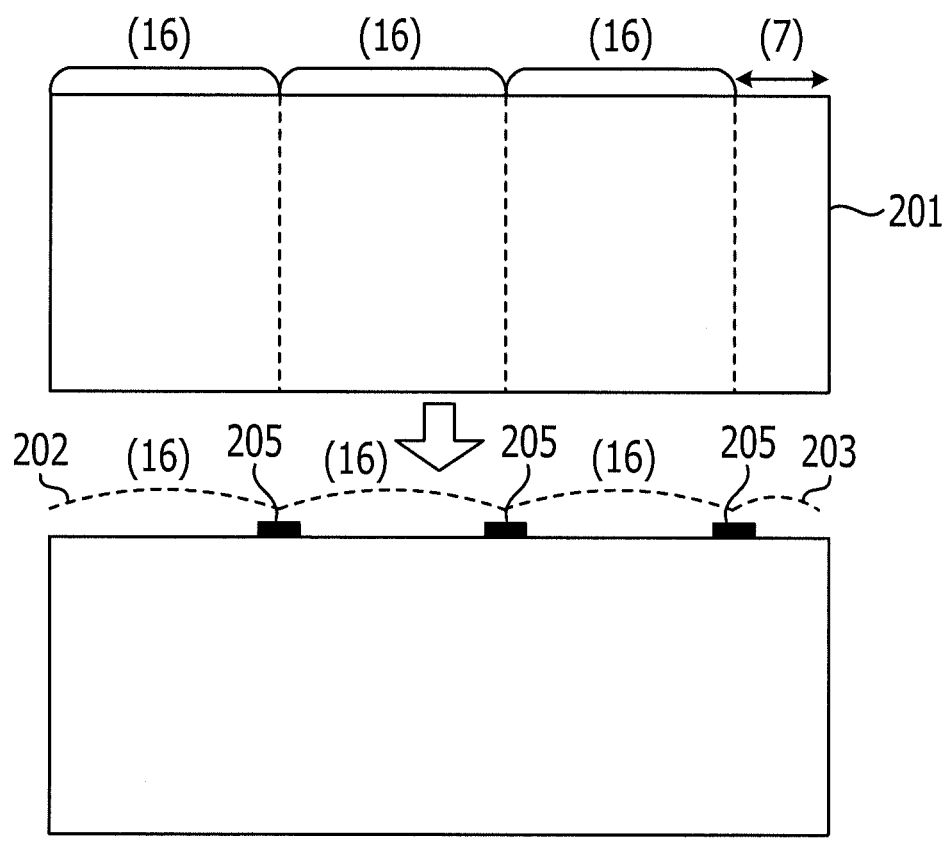
FIG. 6A illustrates a first placement example of markers for detecting positions inside a region.
Figure 6B:
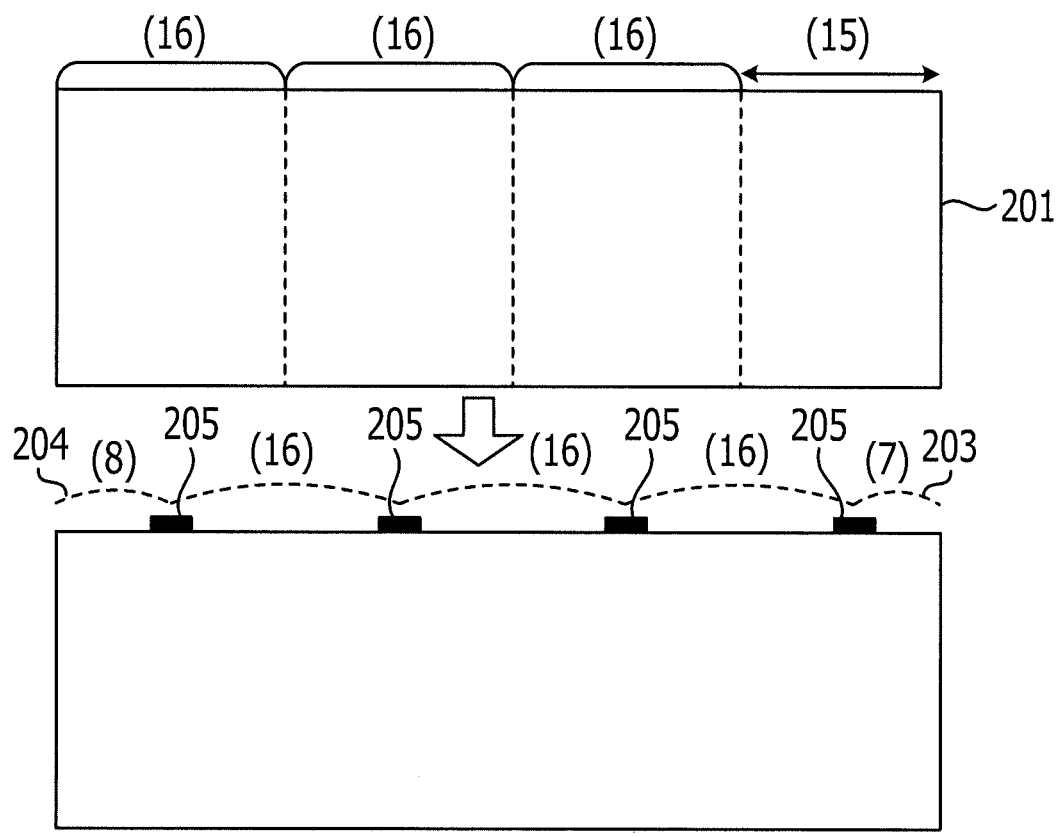
FIG. 6B illustrates a second placement example of markers for detecting positions inside a region.

FIGS. 6A and 6B illustrate examples of the placement of the sub-regional position detection markers 205 according to the marker placement process. In FIGS. 6A and 6B, the value M that is the pitch 202 for placing the sub-regional position detection markers 205 is set to 16.

In FIG. 6A, the length N of the lateral side of the image region 201 is assumed to be 55. In this case, the remainder after dividing N by M is 7, and M multiplied by ½ is equal to or less than the value 8. Thus, the result of the decision in S102 in FIG. 5 is "YES," and the elements of the array P are assigned as P[1]=16, P[2]=32, and P[3]=48 according to the processes S103, and S105 to S108. Then, in the process of S109, the sub-regional position detection markers 205 are added to the outside of the lateral side of the image region 201 according to the values of the elements.

On the other hand, in the placement example in FIG. 6B, the length N of the lateral side of the image region 201 is assumed to be 63. In this case, the remainder of N divided by M is 15 and is larger than the value 8 which is the result of multiplying M by ½. Thus, the result of the decision in S102 of FIG. 5 is "NO," and the elements of the array P are assigned as P[1]=8, P[2]=24, P[3]=40, and P[4]=56 according to the processes S104, and S105 to S108. Then, in the process S109, the sub-regional position detection markers 205 are added to the outside of the lateral side of the image region 201 according to the values of each of the elements. Therefore, the gap 203 decreases from 15 to 7 and the offset 204 of the length 8 is added. In FIG. 6B, accuracy for detecting a position within the gap 203 of the image region 201 is improved since the lateral distance between the sub-regional position detection marker 205 closest to the right edge and the right edge of the image region 201 is reduced from 15 to 7. Furthermore, the lateral distance from the starting edge of the image region 201 to the sub-regional position detection marker 205 closest to the starting edge of the image region 201 is reduced from the pitch 202 width of 16 to the offset 204 length of 8. As a result, accuracy for detecting a position inside the offset 204 of the image region 201 is improved.

Figure 7:
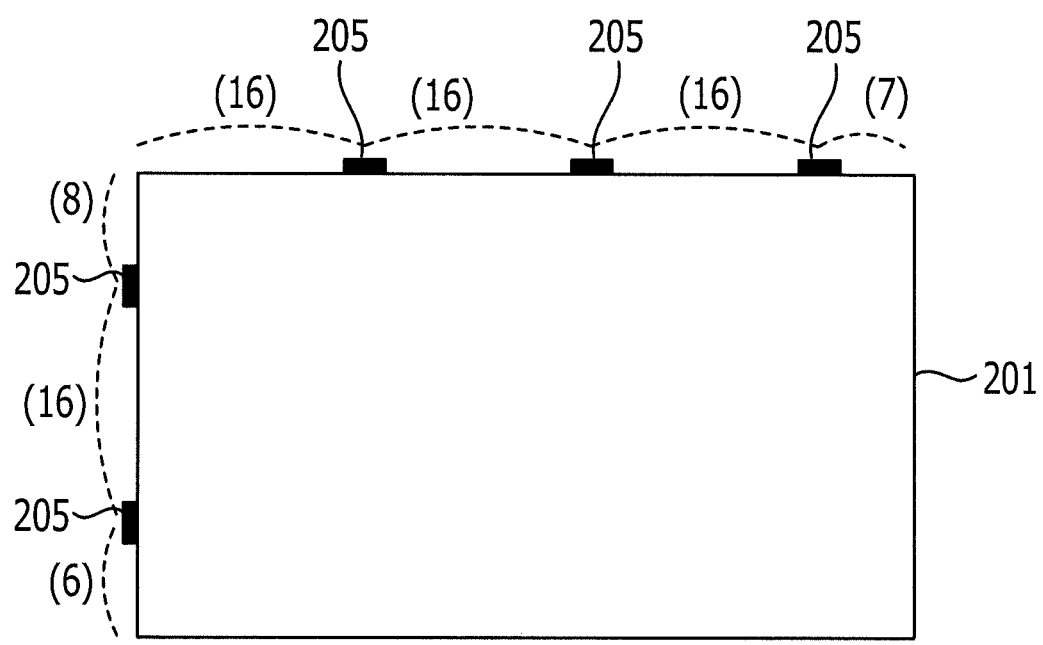
FIG. 7 illustrates a third placement example of markers for detecting positions inside a region.

The above explanation describes the placement of sub-regional position detection markers 205 on a lateral side of a rectangular image region 201. However, the marker placement device 1 conducts placement of sub-regional position detection markers 205 on a vertical side, as illustrated in FIG. 7, in the same way.

Figure 8:
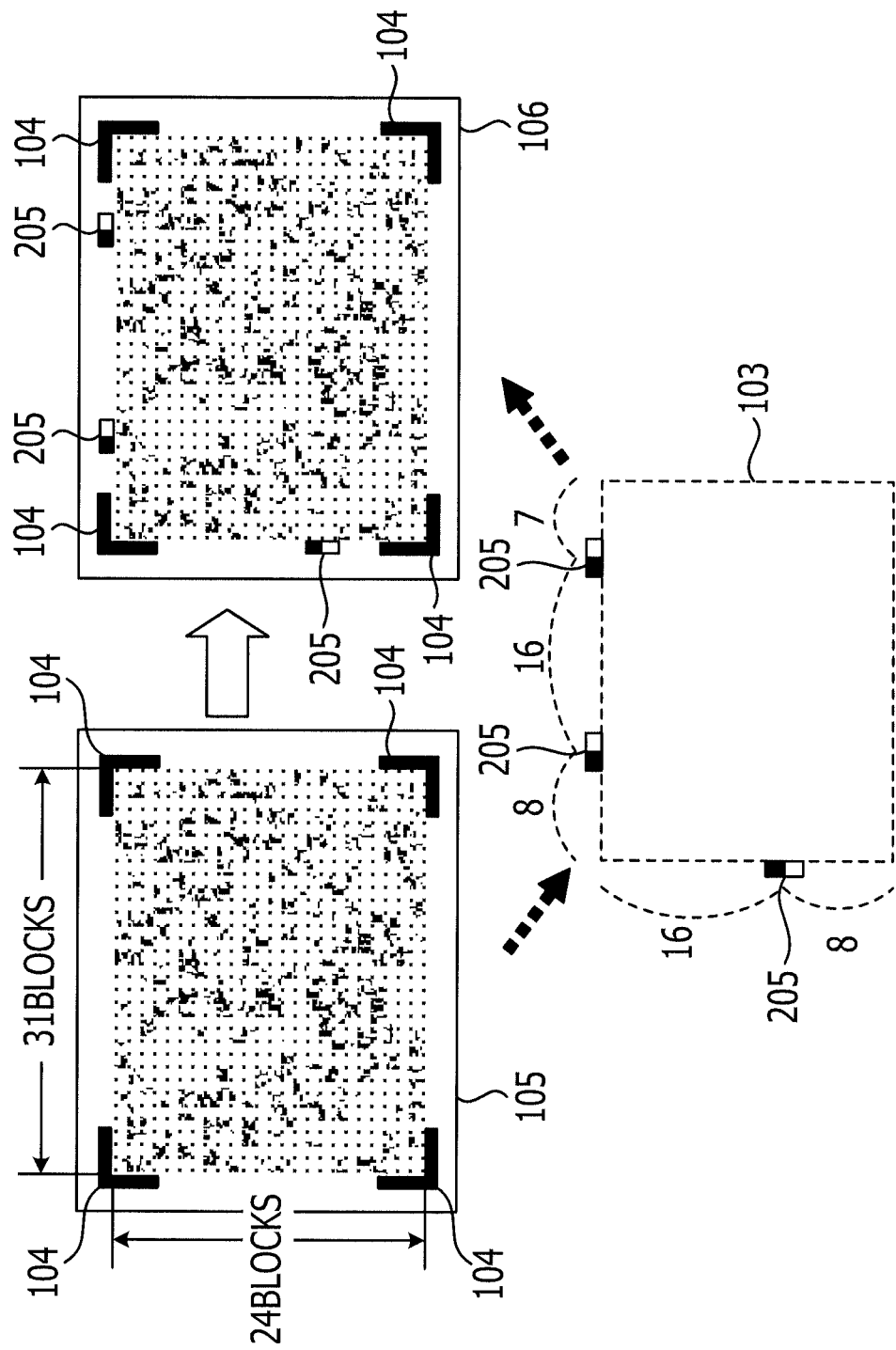
FIG. 8 illustrates a placement example of a marker for detecting a position inside a region onto a region of a regionally encrypted image.

Herein, FIG. 8 will be described. FIG. 8 illustrates an example of placement of the sub-regional position detection marker 205 in a region of the regionally encrypted image 103 of the encryption image 105 illustrated in FIG. 2. In this example, the regionally encrypted image 103 is made up of 31 small blocks laterally and 24 small blocks vertically.

The value M of the pitch 202 for placing the sub-regional position detection marker 205 is set to 16 blocks in both the lateral and vertical directions.

The length N of the lateral side of the regionally encrypted image 103 in FIG. 8 is 31 blocks. Therefore, in this case, the remainder of N divided by M is 15 and is larger than 8 which is the result of multiplying M by ½. Thus, the result of the decision in S102 of FIG. 5 is "NO," and the elements of the array P are assigned as P[1]=8, P[2]=24 according to the processes S104, and S105 to S108. Then, in the process S109, the sub-regional position detection markers 205 are added to the outside of the lateral side of the regionally encrypted image 103 according to the values of each of the elements. As a result, the gap 203 decreases from 15 to 7 and the offset 204 with the length of 8 is added. Then, the sub-regional position detection markers 205 are added to the outside of the lateral side of the regionally encrypted image 103 according to the values of each of the elements in the process S109.

On the other hand, the length N of the vertical side of the regionally encrypted image 103 is 24 blocks. The remainder of N divided by M is 8 which is equal to or less than the value of M multiplied by ½. Thus, the result of the decision in S102 in FIG. 5 is "YES," and the elements of the array P are assigned as P[1]=16 according to the processes S103, and S105 to S108. Then, in the process S109, the sub-regional position detection markers 205 are added to the outside of the lateral side of the regionally encrypted image 103 according to the values of each of the elements. Then, in the process S109, the sub-regional position detection markers 205 are added to the outside of the vertical side of the regionally encrypted image 103 according to the values of each of the elements. In this way, a sub-regional position detection marker addition image 106 is created and outputted by the marker placement device 1.

Figure 9:
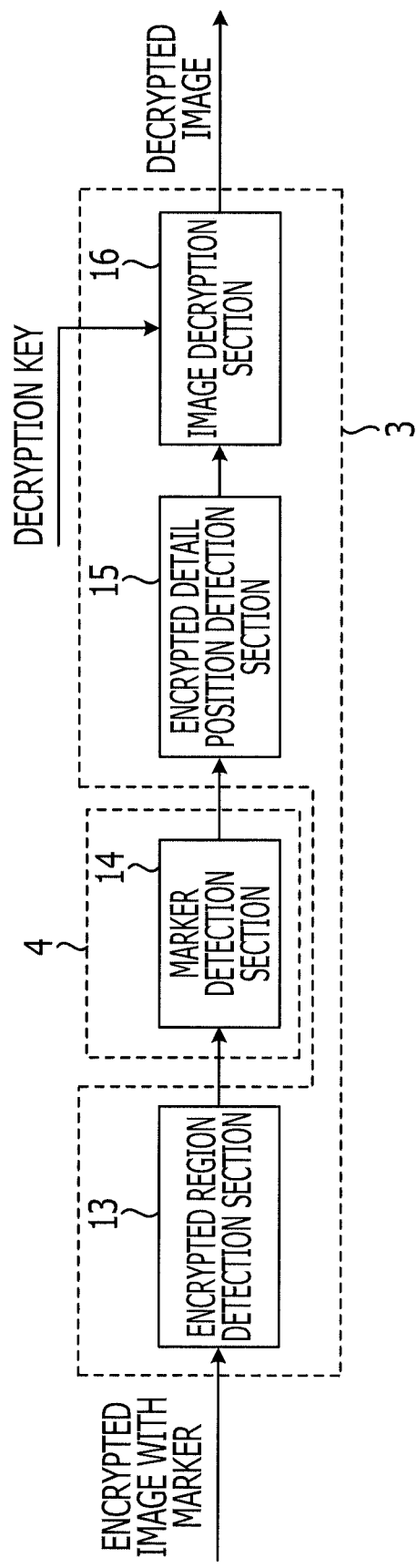
FIG. 9 is a block diagram of a first example of an image decryption system.

Next, FIG. 9 will be described. FIG. 9 is a block diagram of a first example of an image decryption system. This image decryption system is a system in which the sub-regional position detection marker addition image 106 outputted from the image encryption system in FIG. 1 is decrypted and returned to the original image 101.

The image decryption system in FIG. 9 includes an image decryption device 3 and a marker detection device 4. The image decryption device 3 includes an encrypted region detection section 13, an encrypted detail position detection section 15, and an image decryption section 16 as functional blocks. The marker detection device 4 includes a marker detection section 14 as a functional block.

Figure 10:
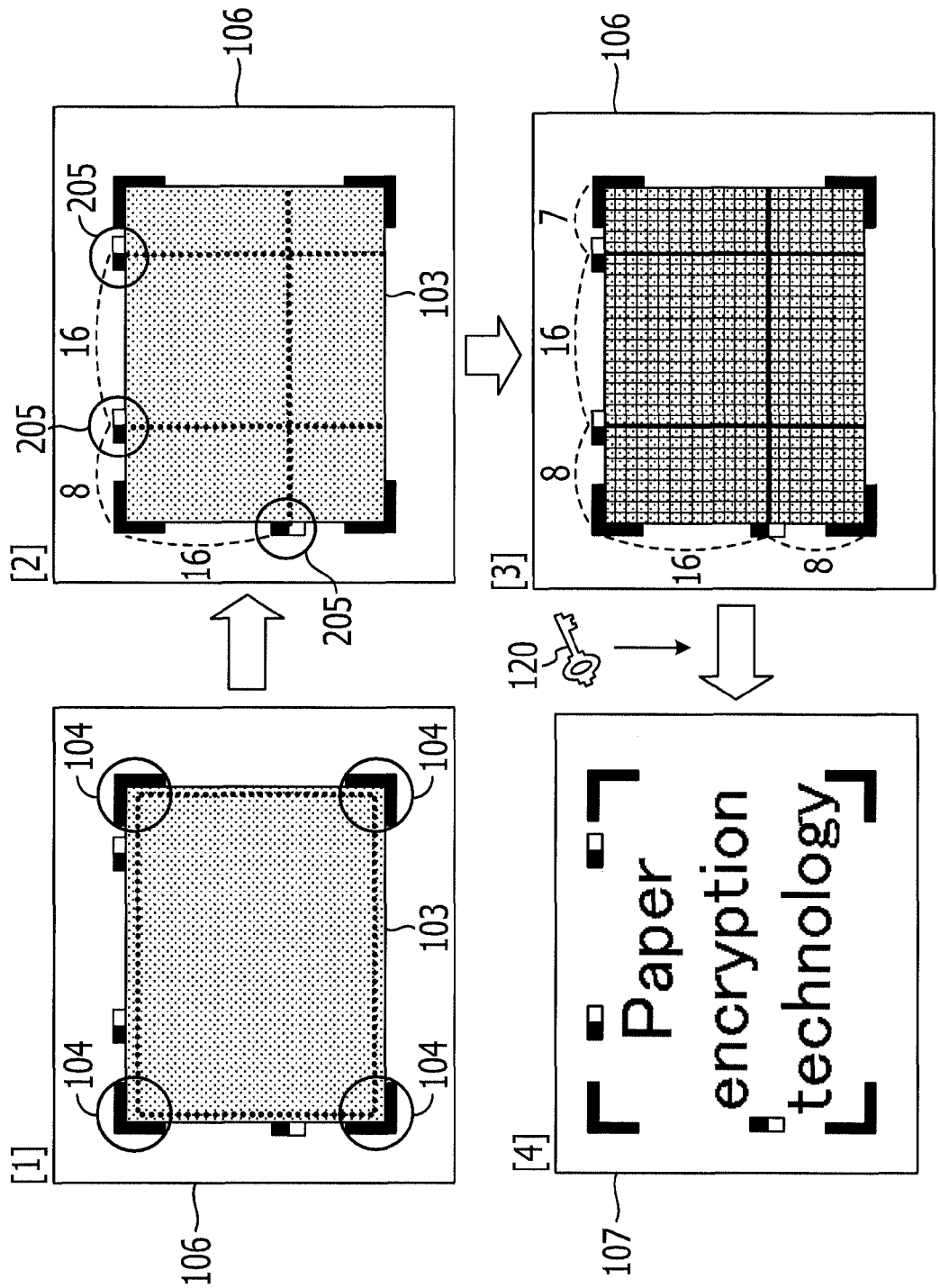
FIG. 10 is a diagram describing image decryption.

Decryption of an encrypted image by the image decryption system will be described using FIG. 10. First, a sub-regional position detection marker addition image 106 outputted from the image encryption system in FIG. 1 is inputted into the image decryption system. Then, in operation [1], the encrypted region detection section 13 of the image decryption device 3 detects positions in the sub-regional position detection marker addition image 106 for the regions of the regionally encrypted image 103. The detection of the positions is conducted based on the regional position detection markers 104 placed abutting the outside of the four corners of the regionally encrypted image 103.

Next, in operation [2], the marker detection section 14 of the marker detection device 4 detects positions of the sub-regional position detection markers 205 added to the outside of the sides of the regionally encrypted image 103. The detection of the positions of the sub-regional position detection markers 205 is described below.

Next, in operation [3], the encrypted region detection section 13 of the image decryption device 3 uses the results of the position detection by the marker detection section 14 to search for positions in the regionally encrypted image 103 for each of the small blocks used during the encryption. Then, in operation [4], the image decryption section 16 of the image decryption device 3 uses a decryption key 120 related to the aforementioned encryption key 110 to decrypt the encryption conducted by the image encryption device 2 in block units to obtain a decrypted image 107. The image decryption system in FIG. 9 operates in this way.

Next, a method for detecting positions of the sub-regional position detection markers 205 by the marker detection section 14 will be explained. As explained above, the value of the offset 204 is set as an invariable at ½ of the pitch 202 in an embodiment. Thus, the searching range for detecting is limited when detecting the first sub-regional position detection marker 205 from the starting edge of each side of the image region 201.

Figure 11A:
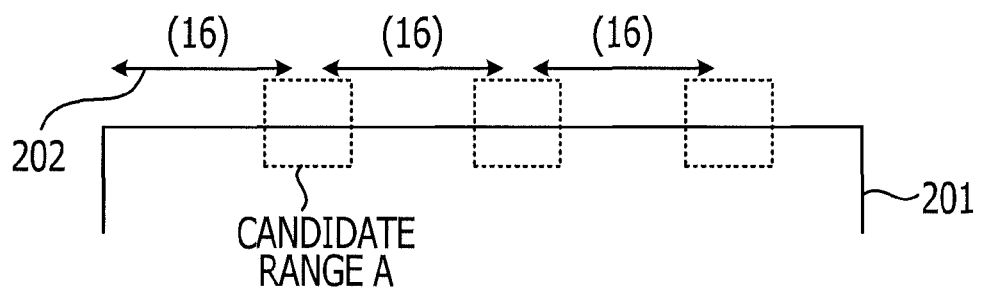
FIG. 11A is a first diagram describing a method for deciding a marker placement position.
Figure 11B:
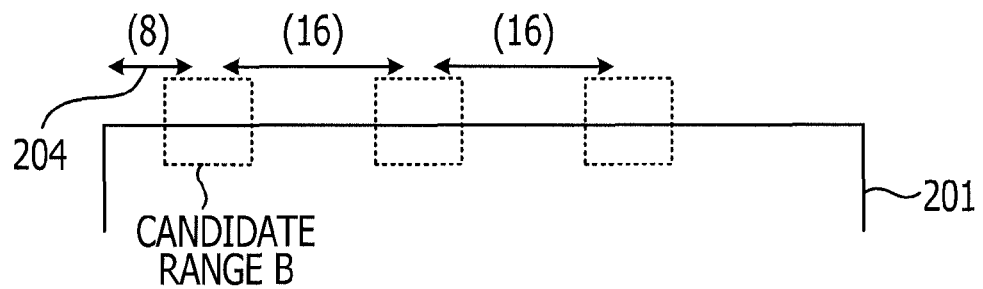
FIG. 11B is a second diagram describing a method for deciding a marker placement position.

For example, as previously described with FIGS. 6A and 6B, the pitch 202 for placing the sub-regional position detection markers 205 is assumed to be 16. In this case, a range in which the sub-regional position detection marker 205 closest to the starting edge of a side can exist is approximately 16 from the starting edge (left edge) as illustrated in a candidate region A in FIG. 11A, or approximately 8 from the starting edge as illustrated in a candidate region B in FIG. 11B.

As a result, the range used by the marker detection section 14 to search for the sub-regional position detection marker 205 closest to the starting edge of the side is limited to the two candidate regions A and B. In this way, the accuracy of the sub-regional position detection marker 205 searching process is improved and the processing load is reduced.

The computer 20 exemplified previously in FIG. 4 may be used to function as the marker detection device 4 in FIG. 9. To enable the computer 20 to operate as the marker detection device 4, first a control program is made that causes the MPU 21 to conduct the content of a marker detection process described below. The created control program is stored on the hard disc drive 24 or the portable recording medium 30 ahead of time. Then, a specific instruction is given to the MPU 21 to read the control program. In this way, the MPU 21 operates as the marker detection section 14. In the same way, the computer 20 can be caused to function as the image decryption device 3.

Figure 12:
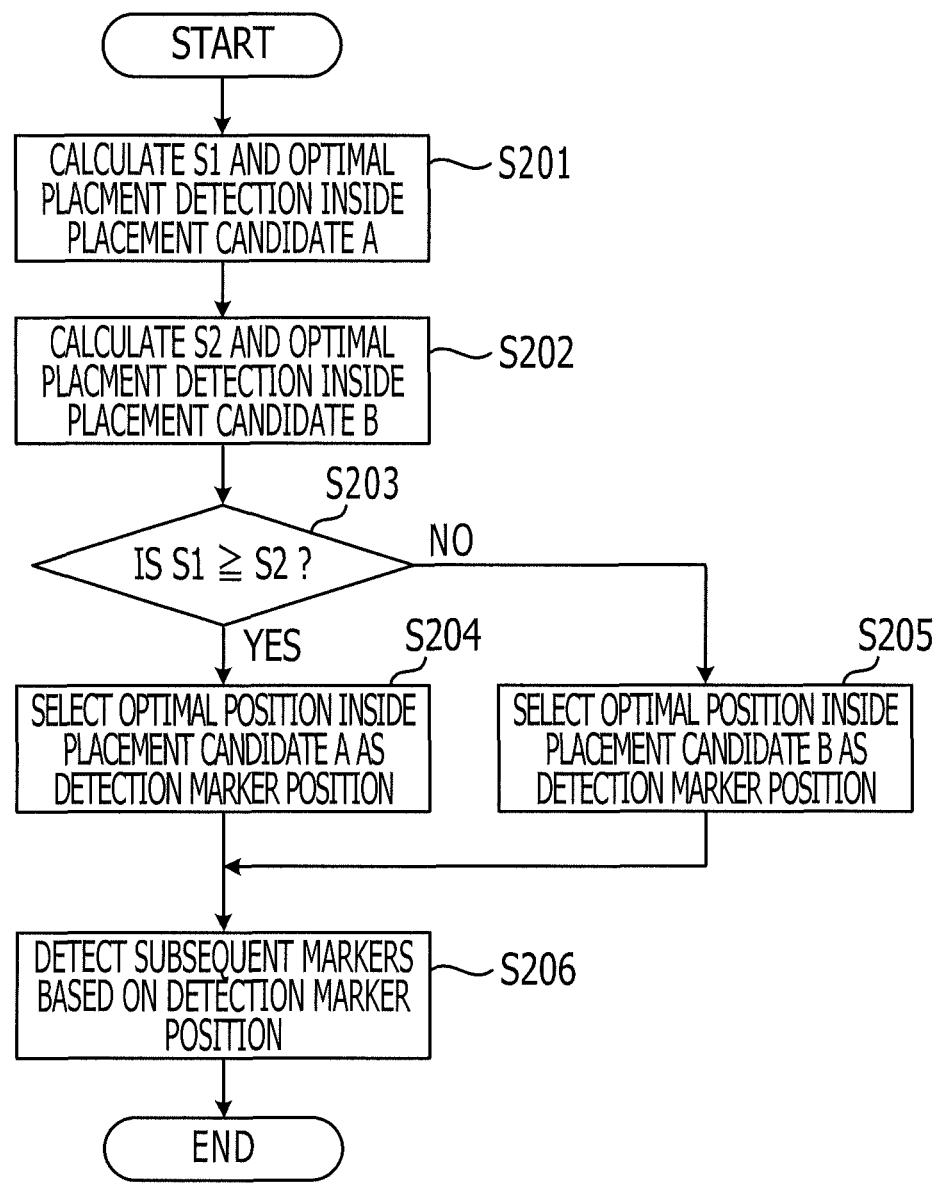
FIG. 12 is a flowchart describing content of a marker detection process.

FIG. 12 will be described next. FIG. 12 is a flowchart describing content of a marker detection process conducted by the marker detection section 14. This process begins when the marker detection device 4 receives the sub-regional position detection marker addition image 106 and the results of the position detection for the regions of the regionally encrypted image 103 sent from the encrypted region detection section 13 of the image decryption device 3.

In FIG. 12, a process for a placement candidate A is conducted in S201. In this process, first, a degree of correlation of the sub-regional position detection marker 205 previously contained in shape information within a range of the placement candidate A is calculated. The range of the placement candidate A is within a specific range centered on a position separated only from the starting edge of a side of the image region 201 by the distance of the pitch 202. Then, a position with the largest degree of correlation is acquired as a first estimated position, and the largest degree of correlation S1 is acquired.

Next, in S202, a process for a placement candidate B is conducted. In this process, first, a degree of correlation of the sub-regional position detection marker 205 previously contained in shape information within a range of the placement candidate B is calculated. The range of the placement candidate B is within a specific range centered on a position separated only from the starting edge of a side of the image region 201 by the distance of the offset 204. In an embodiment, the ranges of the placement candidate A and the placement candidate B are set to not overlap and both ranges have the same width. Then, a position with the largest degree of correlation is acquired as a second estimated position and the largest degree of correlation S2 is acquired.

The processes from S203 to S205 are processes to decide the most probable placement position of the sub-regional position detection marker 205 from among the first and second estimated positions derived in the above processes as the detection result of the placement position.

First, in S203, the aforementioned S1 and S2 are compared. Then, a process is conducted to determine whether or not the degree of correlation between the first estimated position and the sub-regional position detection marker 205 is equal to or larger than the degree of correlation between the second estimated position and the sub-regional position detection marker 205. If the correlation of S1 is equal to or higher than S2 (S203 YES), the process advances to S204. If the correlation of S1 is lower than S2 (S203 NO), the process advances to S205.

In S204, the optimal position acquired in S201 is outputted as a detection result of the placement position of the sub-regional position detection marker 205. Then the process advances to S206. On the other hand, in S205, the optimal position acquired in S202 is outputted as a detection result of the placement position of the sub-regional position detection marker 205. Then the process advances to S206.

Next, in S206, the placement positions of the subsequent sub-regional position detection markers 205 are detected based on the placement detection result of the process in S204 or S205. In this process, the degree of correlation with the sub-regional position detection marker 205 held in the shape information is sequentially calculated within a specified range centered on each of the positions separated from the previously detected placement position by the pitch 202 on the sides of the image region 201. Next, within each range, the position with the highest degree of correlation is outputted as a detection result of the placement position of the sub-regional position detection marker 205. Then the marker detection process is completed. The process described above is the marker detection process.

The sub-regional position detection marker addition image 106 may be expanded or reduced. In this case, a range in which the first sub-regional position detection marker 205 from the starting edge of the side can exist is set wider (for example, possible ranges that are applicable can be set with an expansion ratio of 10% each) when considering expansion and reduction, for detecting the sub-regional position detection markers 205. When an expansion and reduction multiplying factor is known ahead of time, expansion and reduction of the range in which the first sub-regional position detection marker 205 from the starting edge of the side can exist is expanded or reduced according to the multiplying factor.

The regional position detection marker 104 and the sub-regional position detection markers 205 remain in the decrypted image 107 outputted from the image decryption system illustrated in FIG. 9. Partial images of placement regions encrypted may be recovered through placement of these markers using the previously described related art and the like.

Furthermore, the length of the offset 204 is only set to ½ of the pitch 202 in the marker placement position decision conducted by the marker placement method decision section 11 described above. Alternatively, multiple types of offset 204 lengths can be provided so that the length of the offset 204 can be selected according to the width of the gap 203.

For example, when the pitch 202 is 16, lengths of 4, 8, and 12 can be prepared as offsets 204 based on the remainder (in other words, the width of the gap 203) of dividing the length of the lateral side of the image region 201 by 16. In this case, if the width of the gap 203 is from 4 to 7, an offset 204 with the length of 4 is provided at the starting edge of the side. Similarly, when the width of the gap 203 is from 8 to 11, an offset 204 with the length of 8 is provided on the side at the starting edge, and when the width of the gap 203 is 12 to 15, an offset 204 with a length of 12 is provided on the side at the starting edge. By providing the offset 204 in this way, the width of the gap 203 becomes limited to 3 or less.

In this way, if the detection of the sub-regional position detection marker 205 closest to the starting edge on the side of the image region 201 is conducted appropriately, the lateral distance between the sub-regional position detection marker 205 closest to the end edge of the side of the image region 201 and the end edge becomes even shorter. As a result, the accuracy for detecting a position inside the gap 203 of the image region 201 is further improved.

Figure 13:
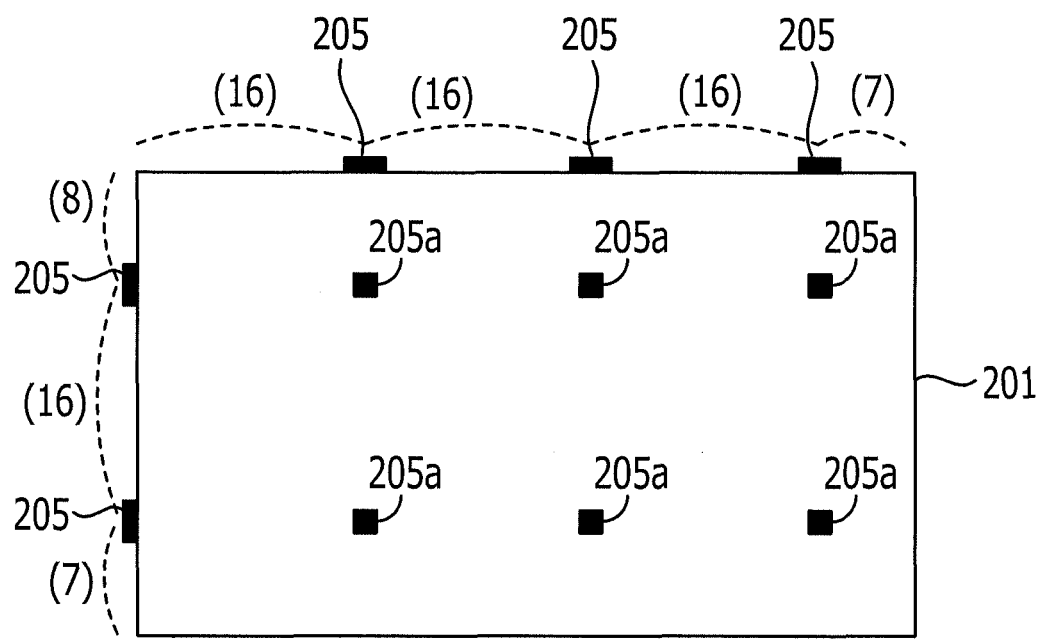
FIG. 13 illustrates a fourth placement example of markers for detecting positions inside a region.

The marker placement device 1 illustrated in FIG. 1 conducts placement of the sub-regional position detection marker 205 on both the lateral and vertical sides that are next to each other in the rectangular image region 201 as illustrated in FIG. 7. In addition, the marker placement device 1 may place sub-regional position detection markers 205a inside the rectangular image region 201 as illustrated in FIG. 13. In this case, the marker placement method decision section 11 decides an intersecting point of a straight line parallel to the vertical side and passing through a placement position of the sub-regional position detection markers 205 on the lateral side of the image region 201, and a straight line parallel to the lateral side and passing through a placement position of the sub-regional position detection markers 205 on the vertical side, as a further placement position.

Figure 14A:
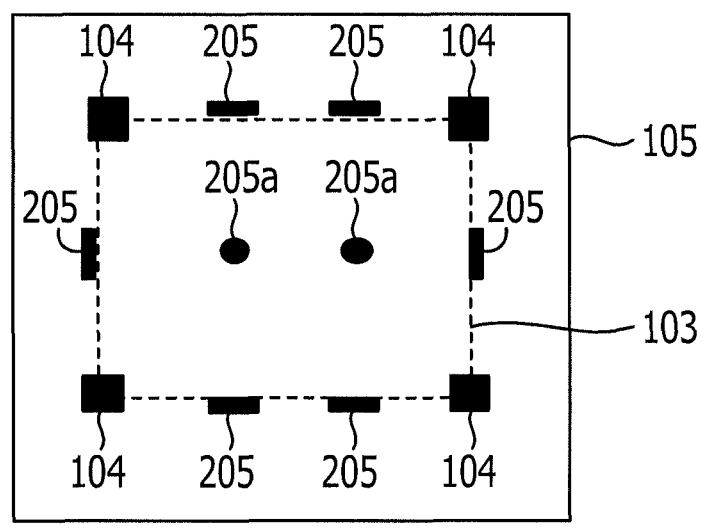
FIG. 14A illustrates a fifth placement example of markers for detecting positions inside a region.

By further placing sub-regional position detection markers 205a inside the image region 201 in this way, detection accuracy can be improved when detecting positions inside the image region 201. In the example illustrated in FIG. 13, the sub-regional position detection markers 205 and the sub-regional position detection markers 205a have the same shape. Alternatively, as illustrated in FIG. 14A, the sub-regional position detection markers 205 placed by the marker placement device 1 on each side of the regions of the rectangular regionally encrypted image 103, and the sub-regional position detection markers 205a placed inside the same regions may have different forms. In this case, the marker adding section 12 adds sub-regional position detection markers 205 and sub-regional position detection markers 205a of different forms to the encrypted image 105 based on the decision of the marker placement method decision section 11. The markers of different forms may differ according to at least one of shape, pattern, and color.

By adding markers of different forms in this way, the possibility of mistakenly detecting different markers may be reduced when attempting to detect sub-regional position detection markers 205 and sub-regional position detection markers 205a.

Figure 14B:
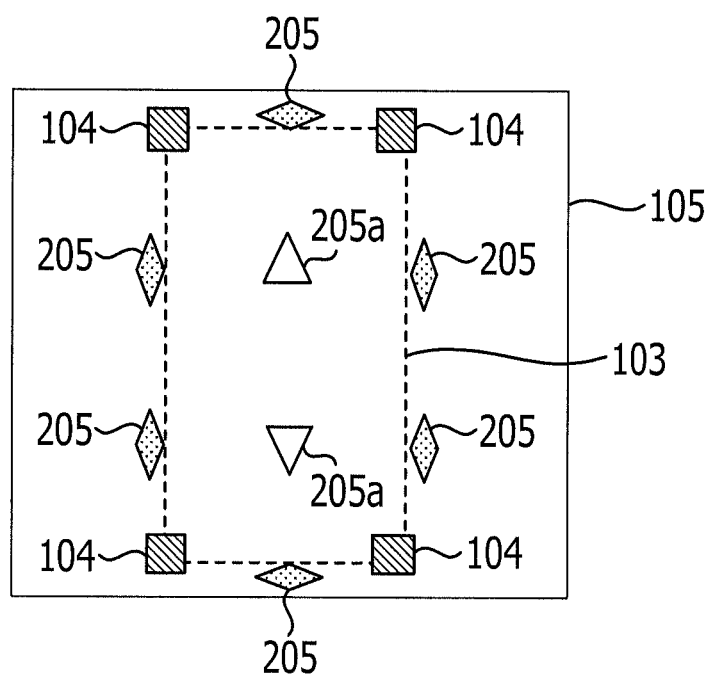
FIG. 14B illustrates a sixth placement example of markers for detecting positions inside a region.

Furthermore, the sub-regional position detection markers 205 and 205a added by the marker adding section 12 may be different from the forms illustrated in FIG. 14A according to the form of a region of the regionally encrypted image 103 as illustrated in FIG. 14B. In the example illustrated in FIG. 14B, sub-regional position detection markers 205 and 205a different from the ones illustrated in FIG. 14A are added by the marker adding section 12 due to the vertically long rectangular region of the regionally encrypted image 103.

Figure 15A:
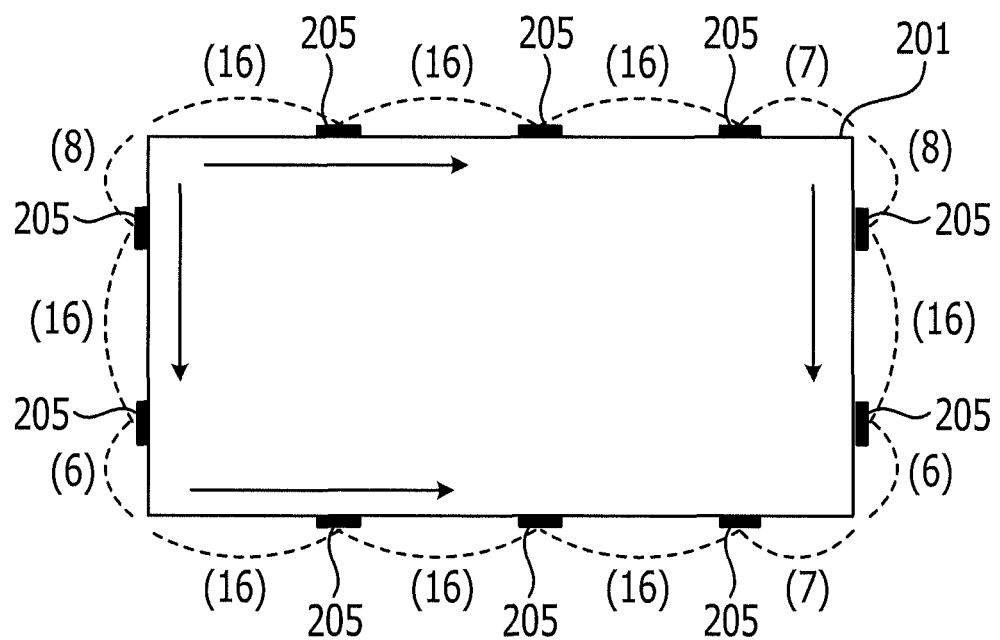
FIG. 15A illustrates a seventh placement example of markers for detecting positions inside a region.

Furthermore, the marker placement device 1 illustrated in FIG. 1 conducts placement of the sub-regional position detection markers 205 on one side each on the lateral and vertical directions of the rectangular image region 201 as illustrated in FIG. 7. Additionally, the sub-regional position detection markers 205 may be placed on two other sides to include all four sides of the rectangular image region 201 as illustrated in FIG. 15A. In other words, the marker placement method decision section 11 may decide placement positions of the sub-regional position detection markers 205 for all sides of the image region 201 rectangle. By placing many sub-regional position detection markers 205 in this way, the detection accuracy for detecting positions inside the image region 201 may be improved.

Figure 15B:
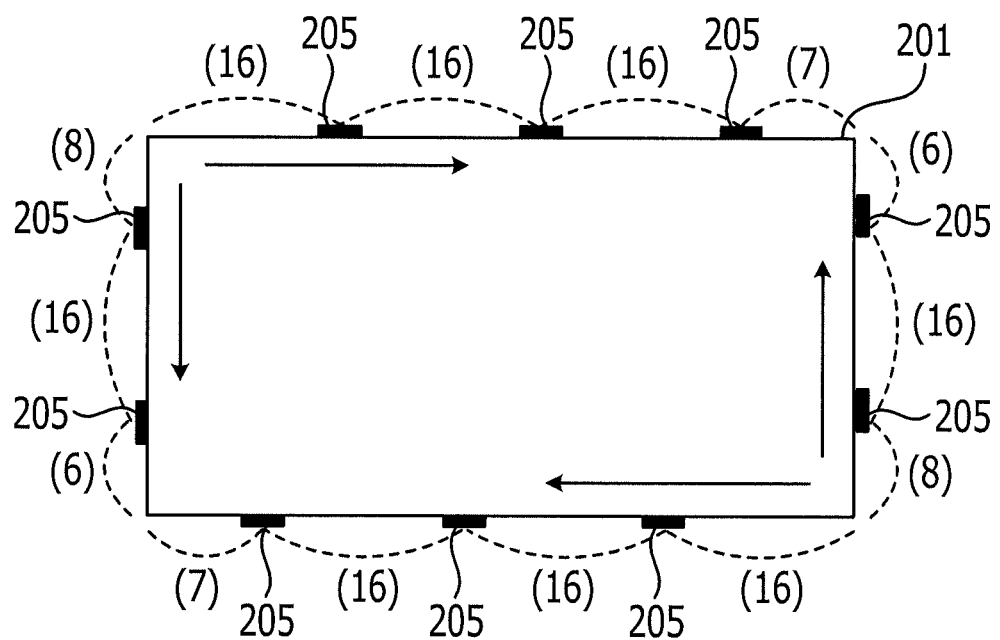
FIG. 15B illustrates an eighth placement example of markers for detecting positions inside a region.

When placing the sub-regional position detection markers 205 illustrated in FIG. 15A, the starting edges of both of the lateral sides of the image region 201 are on the left edge, and the starting edges of both of the vertical sides of the image region 201 are on the top edge. Alternatively, one of the two diagonal points of the image region 201 rectangle may be the starting edge. As illustrated in the example in FIG. 15B, the top left vertex of the left side and the top side of the image region 201 is set as a starting edge, and the bottom right vertex of the bottom edge and the right edge of the image region 201 is set as a starting edge.

Figure 16A:
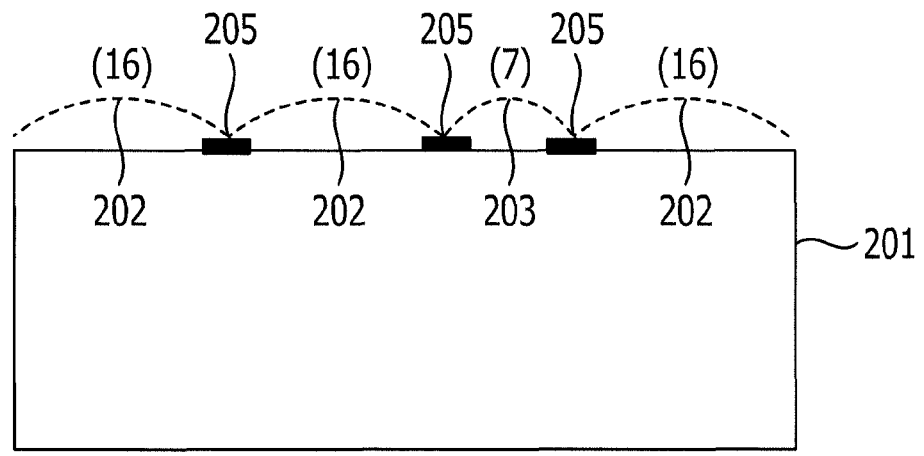
FIG. 16A illustrates a ninth placement example of markers for detecting positions inside a region.
Figure 16B:
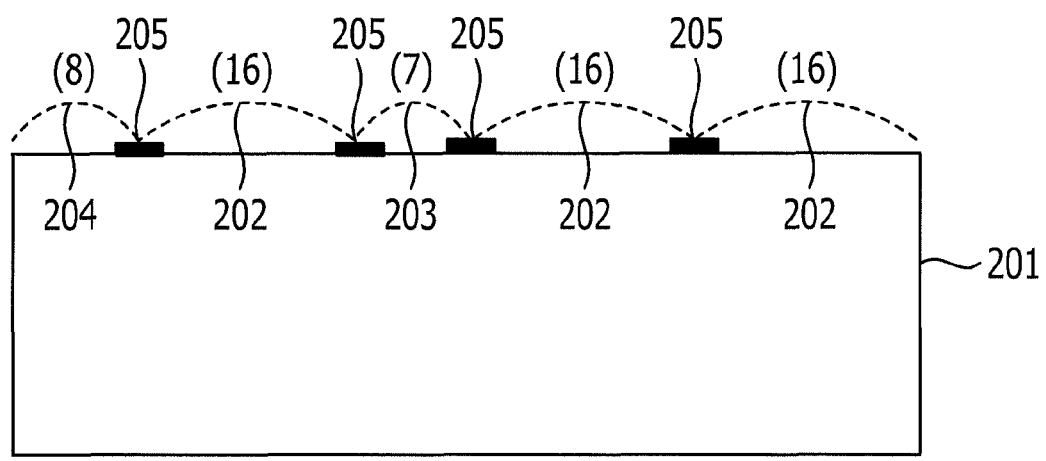
FIG. 16B illustrates a tenth placement example of markers for detecting positions inside a region.

The marker detection process conducted by the marker detection section 14 is conducted so as to detect sub-regional position detection markers 205 in sequence from one edge of each side of the image region 201. The marker detection section 14 detects the sub-regional position detection markers 205 in sequence from both edges of each side of the image region 201 so that the detection process can be conducted more quickly. In this case, the gap 203 may be made the distance between any of the adjacent sub-regional position detection markers 205 as illustrated in FIGS. 16A and 16B. When the marker placement method decision section 11 decides the placement positions of the sub-regional position detection markers 205, the decision for having an offset 204 may be made only at the starting edge of the side when detecting the sub-regional position detection markers 205 from both edges of each side of the image region 201. In the examples illustrated in FIGS. 16A and 16B, the marker detection section 14 may only conduct the decision for having the offset 204 on the left edge side.

Figure 17:
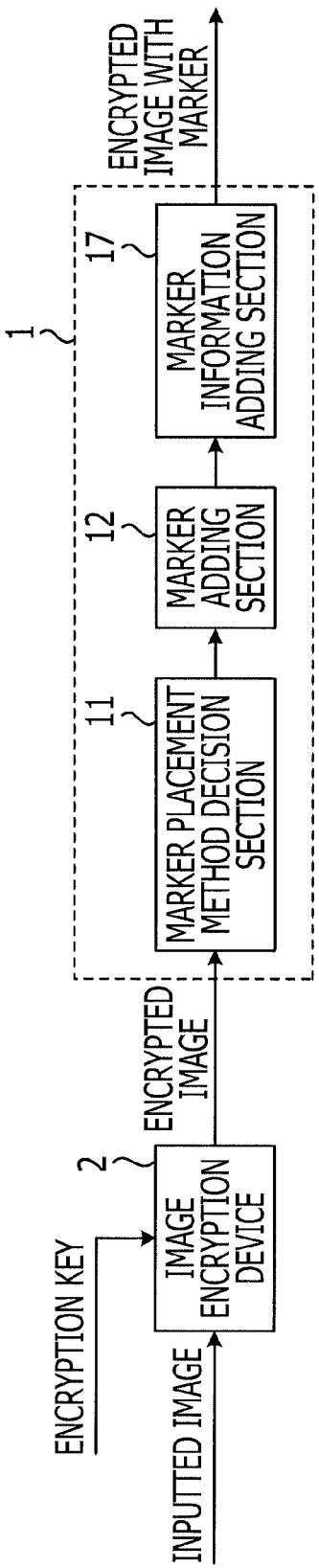
FIG. 17 is a block diagram of a second example of an image encryption system.

Next, FIG. 17 will be described. FIG. 17 is a block diagram of a second example of the image encryption system. The second example illustrated in FIG. 17 and the first example illustrated in FIG. 1 have the same configuration except that the second example includes a marker information adding section 17 on the output side of the marker placement device 1. The marker information adding section 17 will be described with reference to FIG. 18.

The marker information adding section 17 adds, to the relevant image, information about the markers added by the marker adding section 12 to the image.

Figure 2:
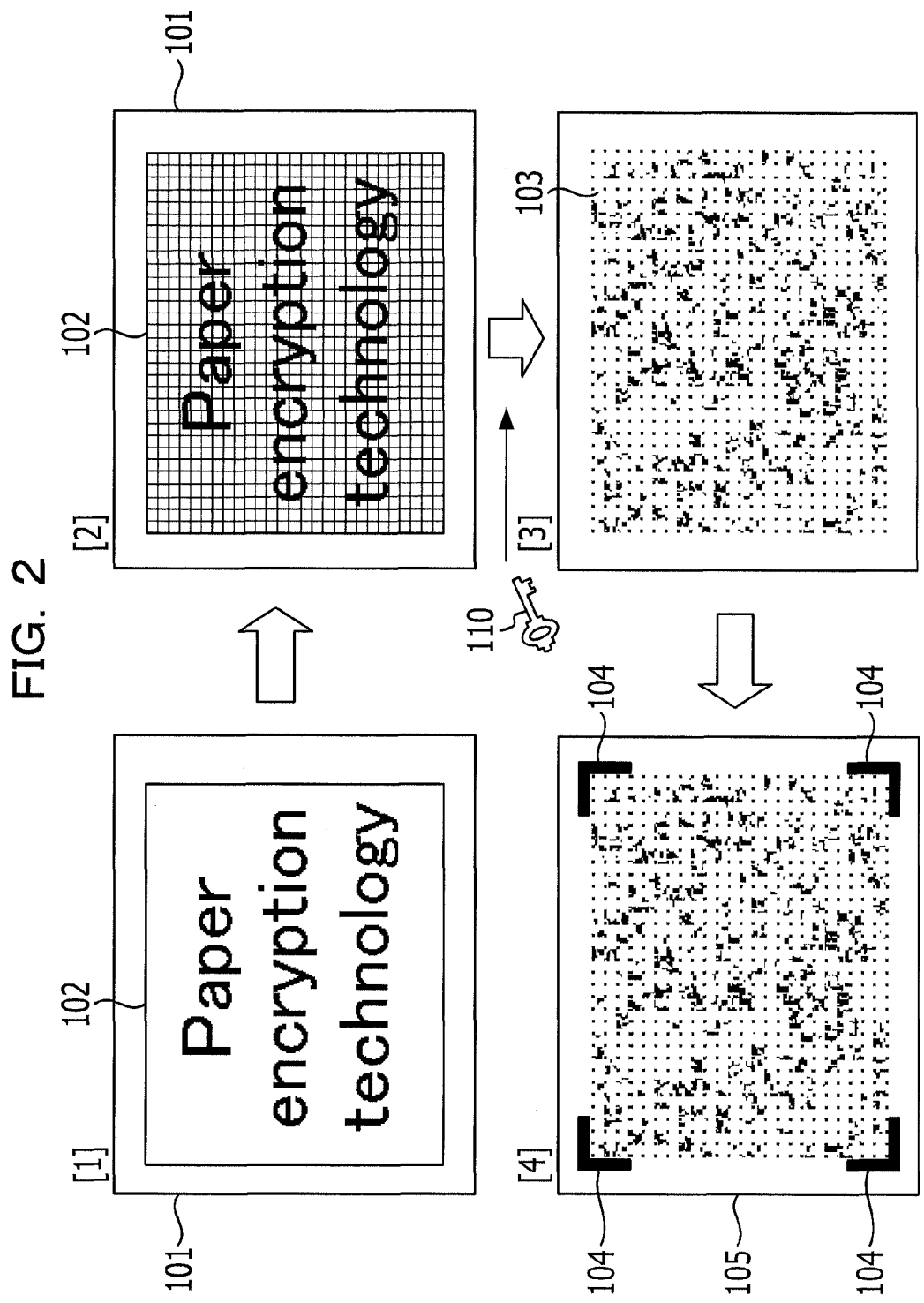
FIG. 2 is a diagram describing an image encryption.
Figure 18:
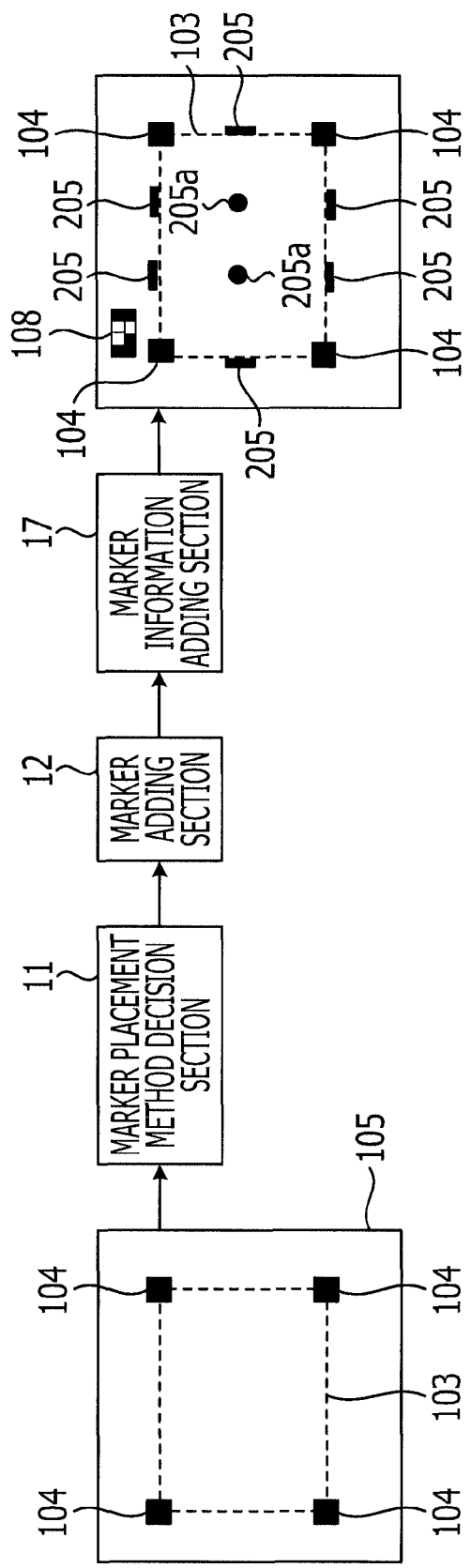
FIG. 18 is a diagram describing an operation of a marker placement information adding section.

The encrypted image 105 illustrated on the left side of FIG. 18 corresponds to the image in operation [4] of FIG. 2; in other words, the image outputted by the image encryption device 2.

The marker placement method decision section 11 decides the placement positions of the sub-regional position detection markers 205 along the sides of the rectangular regionally encrypted image 103 and also, in an embodiment, decides the placement positions of the sub-regional position detection markers 205a inside the regionally encrypted image 103. The marker adding section 12 adds sub-regional position detection markers 205 and 205a to the encrypted image 105 based on the placement position decisions. The marker information adding section 17 adds information on the sub-regional position detection markers 205 and 205a to the encrypted image 105.

Marker information 108 along with regional position detection markers 104 and sub-regional position detection markers 205 and 205a are added to the encryption image 105 illustrated on the right side of FIG. 18. The marker information 108 is information added by the marker information adding section 17.

The marker information 108 includes information describing the forms of each of the sub-regional position detection markers 205 and 205a as well as information on the positions of the markers added to the image by the marker adding section 12. The marker information 108 is used for the sub-regional position detection markers 205 and 205a detection described below.

In FIG. 18, the marker information 108 is two-dimensionally coded and added to the encrypted image 105. Alternatively, the marker information 108 can be added to the encrypted image 105 as, for example, a watermark so as to be unidentifiable by sight, but still detectable when conducting detection of the sub-regional position detection markers 205 and 205a as described below.

Figure 19:
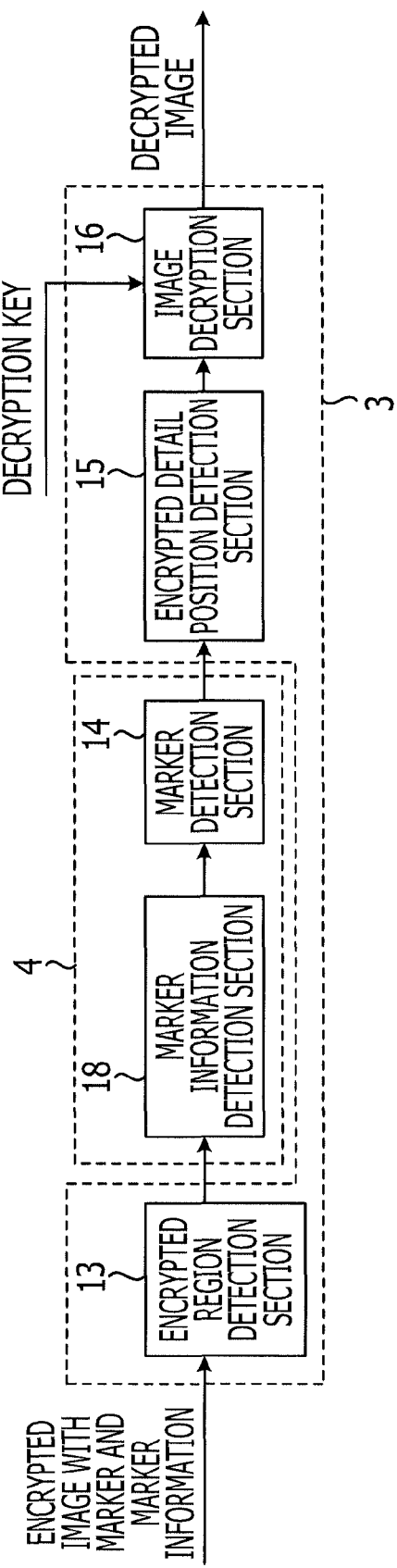
FIG. 19 is a block diagram of a second example of an image decryption system.

Next, FIG. 19 will be described. FIG. 19 is a block diagram of a second example of an image decryption system. The first example illustrated in FIG. 9 and the second example have the same configuration except that the second example includes a marker information detection section 18 in front of the marker detection section 14 of the marker detection device 4. The marker information detection section 18 will be described with reference to FIG. 20.

A degraded encryption image 109 illustrated on the left side of FIG. 20 is the encrypted image 105 illustrated on the right side of FIG. 18 with the added marker information 108. However, the image quality of the encrypted image 105 is degraded due to reduction, distortion, or the like.

The marker information detection section 18 detects the previously described marker information 108 added to the degraded encryption image 109, and sends the content of the marker information 108 to the marker detection section 14. The marker detection section 14 detects the sub-regional position detection markers 205 placed in the degraded encryption image 109 by using the marker information 108 detected by the marker information detection section 18, and furthermore, in an embodiment, detects the placement positions of the sub-regional position detection markers 205a. In this way, the range of placement positions to be detected and the range of forms to be detected can be limited by using the marker information 108 when detecting sub-regional position detection markers 205 and 205a even when the encryption image 105 is reduced or distorted after adding the markers. Therefore, the time needed for detecting the sub-regional position detection markers 205 and 205a can be reduced and detection accuracy can be improved.

According to an embodiment, a computer-implemented method is provided that includes selectively setting a marker, within content, at a position determined based on a size of a gap remaining after determining a placement position of a marker for each pitch relative to the content.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention.

Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. A marker placement device, comprising:
a memory; and
a processor connected with the memory, which:
decides a placement position of a marker, for every predetermined pitch from a starting edge of a side of a rectangular image region having an image to an end edge of the side, and
adds the marker to the image according to the placement position decided, and
wherein, when a gap having a predetermined width relationship to the pitch remains between a placement position closest to the end edge of the side, adding a first marker placement position at a position closest to the starting edge after providing an offset shorter than the gap, and a subsequent marker placement position at the predetermined pitch after the offset, and otherwise maintaining the marker as added.

2. The marker placement device according to claim 1, wherein, the placement position of the marker is decided at the predetermined pitch from the starting edge of the side to the end edge of the side without providing the offset when the gap is equal to or less than one half of the pitch.

3. The marker placement device according to claim 2, wherein, the first marker placement position is decided at the position closest to the starting edge and each subsequent marker placement position is decided at a predetermined pitch from the first marker placement position after providing the offset that is half a length of the pitch on the starting edge side of the side when the gap is wider than one half of the pitch.

4. The marker placement device according to claim 1, wherein, the placement position of the marker is decided for a first side and a second side that are adjacent to each other in a rectangle of the image region.

5. The marker placement device according to claim 4, wherein, within the image region, the processor decides an intersecting point of a straight line parallel to the second side and passing through the placement position of the marker on the first side, and a straight line parallel to the first side and passing through the placement position of the marker on the second side, as the placement position of the marker.

6. The marker placement device according to claim 5, wherein, markers with different forms are placed at marker placement positions on the first side and second side, and at the placement position of the marker at the intersecting point.

7. The marker placement device according to claim 1, wherein, marker placement positions are decided for all sides of the rectangle image region.

8. The marker placement device according to claim 1, wherein the processor adds, to the image, marker information about the marker added to the image.

9. The marker placement device according to claim 8, wherein, the marker information includes position information of the marker added to the image.

10. The marker placement device according to claim 8, wherein, the marker information includes information indicating each form of the markers added to the image.

11. A marker placement detection device comprising:
a memory; and
at least one processor connected with the memory, which:
decides a placement position of a marker, for every predetermined pitch from a starting edge of a side of a rectangular image region having an image to an end edge of the side,
adds the marker to the image according to the placement position decided,
wherein, when a gap having a predetermined width relationship to the pitch remains between a placement position closest to the end edge of the side, adding a first marker placement position at a position closest to the starting edge after providing an offset shorter than the gap, and a subsequent marker placement position at the predetermined pitch after the offset, and otherwise maintaining the marker as added,
estimates, as a first estimated position, the placement position of the marker within a first candidate range centered around a position separated from the starting edge of the side of the image region only by the pitch,
estimates, as a second estimated position, the placement position of the marker within a second candidate range centered around a position separated from the starting edge of the side of the image region only by the offset, and
decides that one of the first estimated position and the second estimated position with a highest probability of being the marker placement position is a placement position detection result of the marker.

12. The marker placement detection device according to claim 11, wherein, the placement position of the marker is decided at the predetermined pitch from the starting edge of the side to the end edge of the side without providing the offset when the gap is equal to or less than one half of the pitch.

13. The marker placement detection device according to claim 11, wherein, the processor decides the first marker placement position is closest to the starting edge and decides each subsequent marker placement position is at a predetermined pitch from the first marker placement position after providing the offset that is half a length of the pitch on the starting edge of the side when the gap is wider than one half of the pitch.

14. The marker placement detection device according to claim 11, wherein, the placement position of the marker is decided for a first side and a second side that are adjacent to each other in a rectangle of the image region.

15. The marker placement detection device according to claim 11, wherein, within the image region, the processor decides an intersecting point of a straight line parallel to the second side and passing through the placement position of the marker on the first side, and straight line parallel to the first side and passing through the placement position of the marker on the second side, as the marker placement position.

16. A computer-readable non transitory storage medium storing a marker placement program that causes a computer to execute an operation, comprising:
deciding a placement position of a marker at a predetermined pitch from a starting edge of a side of a rectangular image region having an image to an end edge of the side; and
adding the marker to the image according to the placement position decided, and
wherein, when a gap having a predetermined width relationship to the pitch remains between a placement position closest to the end edge of the side, adding a first marker placement position closest to the starting edge after providing an offset shorter than the gap, and a subsequent marker at the predetermined pitch after the offset, and otherwise maintaining the marker as added.

17. The computer-readable non transitory storage medium according to claim 16, wherein, the placement position of the marker at the predetermined pitch from the starting edge of the side to the end edge of the side is decided without providing the offset when the gap is equal to or less than one half of the pitch.

18. The computer-readable non transitory storage medium according to claim 16, wherein, the first marker placement position closest to the starting edge is decided and each subsequent marker placement position is decided at a predetermined pitch from the first marker placement position after providing the offset that is half a length of the pitch on the starting edge side of the side when the gap is wider than one half of the pitch.

19. The computer-readable non transitory storage medium according to claim 16, wherein, the marker placement positions for a first side and a second side that are adjacent to each other in a rectangle of the image region are decided in the deciding of the placement position of the marker.

20. The computer-readable non transitory storage medium according to claim 16, wherein, an intersecting point of a straight line parallel to the second side and passing through the placement position of the marker on the first side, and of a straight line parallel to the first side and passing through the placement position of the marker on the second side, is decided as the placement position of the marker within the image region.

* * * * *